(12) United States Patent
Conner et al.

(10) Patent No.: US 10,508,213 B2
(45) Date of Patent: Dec. 17, 2019

(54) AQUEOUS DISPERSION OF KETO-FUNCTIONALIZED POLYMER PARTICLES AND POLYMER BEADS

(71) Applicant: Rohm and Haas Company, Collegeville, PA (US)

(72) Inventors: David M. Conner, Dresher, PA (US); Joy A. Gallagher, Eagleville, PA (US); Philip R. Harsh, Gilbertsville, PA (US); Partha S. Majumdar, Harleysville, PA (US); Edwin Nungesser, Horsham, PA (US)

(73) Assignee: Rohm and Haas Company, Philadelphia, PA (US)

( * ) Notice: Subject to any disclaimer, the term of this patent is extended or adjusted under 35 U.S.C. 154(b) by 154 days.

(21) Appl. No.: 15/691,839

(22) Filed: Aug. 31, 2017

(65) Prior Publication Data

US 2018/0072913 A1    Mar. 15, 2018

Related U.S. Application Data

(60) Provisional application No. 62/385,497, filed on Sep. 9, 2016.

(51) Int. Cl.
*C09D 133/12*    (2006.01)
*C09D 5/02*    (2006.01)

(52) U.S. Cl.
CPC ............ *C09D 133/12* (2013.01); *C09D 5/02* (2013.01)

(58) Field of Classification Search
None
See application file for complete search history.

(56) References Cited

U.S. PATENT DOCUMENTS

| | | | |
|---|---|---|---|
| 4,403,003 A | 9/1983 | Backhouse | |
| 7,768,602 B2 | 8/2010 | LaFleur et al. | |
| 7,829,626 B2 | 11/2010 | Chiou et al. | |
| 2003/0224184 A1* | 12/2003 | Hermes | C09D 5/004 428/447 |
| 2007/0218291 A1* | 9/2007 | Chiou | C09D 7/69 428/411.1 |
| 2013/0052454 A1 | 2/2013 | Donovan et al. | |
| 2017/0335129 A1* | 11/2017 | Wang | B05D 3/0254 |

* cited by examiner

*Primary Examiner* — Robert T Butcher
(74) *Attorney, Agent, or Firm* — Reid S. Willis

(57) ABSTRACT

The present invention relates to a composition comprising an aqueous dispersion of polymer particles and crosslinked polymer beads that are each functionalized with keto groups, and a diamine or dihydrazide crosslinking agent. The dispersions of the present invention are useful in coatings applications.

8 Claims, No Drawings

AQUEOUS DISPERSION OF KETO-FUNCTIONALIZED POLYMER PARTICLES AND POLYMER BEADS

The present invention relates to an aqueous dispersion of polymer particles and crosslinked polymer beads that are each functionalized with keto groups. The dispersions of the present invention are useful in coatings applications.

Architectural coatings with low pigment volume concentration (PVC) show better durability and stain removal attributes as compared with high PVC coatings. Low PVC coatings tend to be in the semi-gloss to high gloss sheen range where the film forming polymer drives the main performance attributes. High gloss paints predominantly comprise film forming polymer and inorganic pigment. Inorganic extenders such as calcium carbonate, clay, silica, and the like, are used to reduce the cost of the formulation and the gloss of the coating but, ultimately, at the expense of the performance of the dried coating. The increased surface area of the extender results in considerable interactions between extender and binder, thereby reducing the efficiency by which the binder can build performance in the dried coating. Accordingly, it would be an advance in the art of coating formulations to discover a way to achieve low gloss with relatively high performance.

SUMMARY OF THE INVENTION

The present invention addresses a need in the art by providing a composition comprising
a) an aqueous dispersion of
  1) polymer particles having an average particle size in the range of from 75 nm to 350 nm, and
  2) crosslinked polymer beads having an average particle size in the range of from 1 μm to 30 μm;
wherein the polymer particles comprise from 0.1 to 12 weight percent structural units of a monomer containing keto functionality, based on the weight of the polymer particles; and the crosslinked polymer beads comprise 0.05 to 12 weight percent structural units of a monomer containing keto functionality based on the weight of the crosslinked polymer beads; and
wherein the weight to weight ratio of polymer particles to crosslinked polymer beads is in the range of 1:10 to 10:1; and
b) from 0.1 to 10 weight percent of a dihydrazide or a polyamine crosslinking agent, based on the weight of the paint composition.

The composition of the present invention provides coatings with surprisingly improved scrub resistance over bimodal dispersions not similarly functionalized.

DETAILED DESCRIPTION OF THE INVENTION

The present invention addresses a need in the art by providing a composition comprising
a) an aqueous dispersion of
  1) polymer particles having an average particle size in the range of from 75 nm to 350 nm, and
  2) crosslinked polymer beads having an average particle size in the range of from 1 μm to 30 μm;
wherein the polymer particles comprise from 0.1 to 12 weight percent structural units of a monomer containing keto functionality, based on the weight of the polymer particles; and the crosslinked polymer beads comprise 0.05 to 12 weight percent structural units of a monomer containing keto functionality based on the weight of the crosslinked polymer beads; and
wherein the weight to weight ratio of polymer particles to crosslinked polymer beads is in the range of 1:10 to 10:1; and
b) from 0.1 to 10 weight percent of a dihydrazide or a polyamine crosslinking agent, based on the weight of the paint composition.

The polymer particles are preferably acrylic or styrene-acrylic polymer particles having an average particle size preferably in the range of from 80 nm to 250 nm. As used herein, average particle size for the polymer particles refers to the particle size measured using a Brookhaven BI90 particle analyzer.

The polymer particles are preferably film-forming at ambient temperature; accordingly, the polymer particles preferably have a $T_g$, as calculated by the Fox equation, of less than 25° C., more preferably less than 15° C., and most preferably less than 5° C. Preferably, the polymer particles comprise structural units of methyl methacrylate ($T_g=105°$ C.) or styrene ($T_g=100°$ C.), and at least one monomer selected from the group consisting of ethyl acrylate ($T_g=-22°$ C.), butyl acrylate ($T_g=-54°$ C.), 2-ethylhexyl acrylate ($T_g=-85°$ C.), and 2-propylheptyl acrylate ($T_g=-68°$ C.).

The polymer particles, which are advantageously prepared using conventional single or multistage emulsion polymerization chemistry, further comprise from 0.1, more preferably from 0.5, and most preferably from 1 weight percent, to 12, preferably to 10, and more preferably to 8 weight percent structural units of a monomer with keto functionality, that is, a monomer containing a ketone or aldehyde group, based on the weight of the polymer particles. Preferred monomers with keto functionality are acetoacetoxyethyl methacrylate (AAEM, $T_g=3°$ C.), preferably at a concentration in the range of from 2 to 10 weight percent, based on the weight of the polymer particles, or diacetone acrylamide (DAAM, ($T_g=85°$ C.)), preferably at a concentration in the range of from 1 to 5 weight percent, based on the weight of the polymer particles. Additionally, the polymer particles preferably comprise from 0.2, more preferably from 0.5, and most preferably from 1 weight percent, to preferably 5, and more preferably to 3 weight percent structural units of a carboxylic acid monomer such as acrylic acid ($T_g=103°$ C.), methacrylic acid ($T_g=185°$ C.), or itaconic acid ($T_g=154°$ C.).

The crosslinked polymer beads preferably have an average particle size in the range of from 2 μm, and more preferably from 5 μm, to preferably 20 μm, and more preferably to 15 μm. As used herein, the average particle size of polymer beads refers to the size as measured by a Malvern Mastersizer 2000 Analyzer equipped with a 2000 uP module. The crosslinked polymer beads preferably comprise from 0.1, more preferably from 0.2, and most preferably from 0.5, to preferably 10, more preferably to 8 weight percent structural units of a monomer containing keto functionality based on the weight of the polymer beads.

The aqueous dispersion of crosslinked polymer beads can be prepared by a variety of methods such as those disclosed in US Pat. Pub. 2013/0052454; U.S. Pat. Nos. 4,403,003; 7,768,602; and 7,829,626. In a preferred process a colloidal stabilizer such as hydroxyethyl cellulose (HEC), poly(vinyl alcohol) (PVOH), poly(vinyl pyrrolidone) (PVP), or a non-ionic surfactant is dissolved in water to form an aqueous phase; the organic phase is prepared by mixing monomers and crosslinker such as divinyl benzene or allyl methacrylate and dissolving initiator in the monomer mix. Preferred initiators are hydrophobic and, therefore, partition predominantly into the monomer phase; examples of preferred initiators are benzoyl peroxide, lauroyl peroxide, and t-butyl peroctoate. A monomer emulsion is prepared by homogenizing the aqueous and organic phases using any suitable means such as mechanical agitation. Thermal initiated processes are preferred. The polymerization may be conducted by a batch, semi-continuous, or continuous process and the polymeric beads may be prepared by single stage or a multistage polymerization process.

If the polymerization is carried out in multiple stages, it is preferred that one stage comprises copolymerizing a crosslinking monomer and a low $T_g$ monomer such as 2-ethylhexyl acrylate ethyl acrylate, butyl acrylate, or 2-propylheptyl acrylate, and another stage comprises polymerization of a high $T_g$ monomer such as methyl methacrylate or styrene. The keto containing monomer may be found in one or multiple stages of the multistage polymerization. Preferably, the multistage polymerization reaction is carried out in two stages.

The weight-to-weight ratio of the polymer particles to the crosslinked polymer beads is in the range of 1:10, preferably from 4:6; to 10:1, preferably to 8:2.

The composition further includes from 0.1, preferably from 0.2, and more preferably from 0.5 weight percent, to 10, and preferably to 5 weight percent of a dihydrazide or a polyamine crosslinking agent, based on the weight of the paint composition. Examples of polyamine crosslinking agents include diamines such as 3,3'-(ethane-1,2-diylbis(oxy))bis(propan-1-amine); 4,9-dioxadodecane-1,12-diamine; 4,9-dioxadodecane-1,12-diamine; 4,7-dioxadodecane-1,10-diamine; and 4,7,10-trioxatridecane-1,13-diamine. Commercial examples of polyamines are polyetheramines such as JEFFAMINE D-230, JEFFAMINE D-400, JEFFAMINE D-2000, JEFFAMINE M-600, JEFFAMINE M-1000, JEFFAMINE ED-600, JEFFAMINE ED-900, T-403, and JEFFAMINE T-3000 polyetheramines.

Examples of dihydrazide crosslinking agents include adipic acid dihydrazide (ADH), carbodihydrazide (CDH), sebacic acid dihydrazide (SDH), valine dihydrazide (VDH), isophthalic dihydrazide (ISODH), and icosanedioic hydrazide ICODH). Preferably, the crosslinking agent is a dihydrazide, more preferably ADH.

The composition of the present invention preferably comprises a substantial absence of inorganic extenders having a refractive index in the range of 1.0 to 1.9, which tend to have an adverse effect the scrub and stain resistance of the consequent coating. As used herein, "substantial absence" refers to less than 10, preferably less than 5, more preferably less than 1, and most preferably 0 PVC of any extender having a refractive index in the prescribed range. Examples of extenders substantially absent from the composition include silica, silicates and aluminosilicates such as talc, clay, mica, and sericite; $CaCO_3$; nepheline syenite; feldspar; wollastonite; kaolinite; dicalcium phosphate; and diatomaceous earth.

The composition of the present invention advantageously comprises a variety of other additives such as rheology modifiers, defoamers, neutralizing agents, surfactants, dispersants, organic pigments such as opaque polymers, and high refractive index inorganic pigments ($R_I$>2) such as $TiO_2$. It has been surprisingly discovered that coatings prepared from the composition of the present invention exhibit superior scrub resistance as compared to coatings from aqueous dispersions of polymeric beads and binder that are not similarly functionalized with keto groups.

EXAMPLES

Intermediate Example 1

Synthesis of DAAM Functionalized Microsphere Beads

An aqueous phase for the monomer emulsion was prepared by dissolving CELLOSIZE™ Hydroxyethyl Cellulose QP-3L (HEC, 3.8 g, A Trademark of The Dow Chemical Company or its Affiliates) in deionized water (332.3 g). Once the HEC was fully dissolved, Polystep A-16-22 anionic surfactant (1.2 g) and diacetone acrylamide (DAAM, 1.5 g) were added to the solution. The organic phase for the monomer emulsion was prepared by mixing allyl methacrylate (ALMA, 6.1 g) with 2-ethylhexyl acrylate (2-EHA, 145.1 g) followed by dissolution of Luperox LP lauroyl peroxide (0.87 g).

The aqueous phase and the organic phase were combined in a 2-L flask and homogenized using a Pro Model #250 rotor-stator homogenizer. The emulsion was polished for 30 s at a power setting of 1. The polished emulsion was transferred to a 1-L reactor equipped with a half-moon stirring blade. The agitation was set to 130 rpm and the contents of the reactor were sparged with $N_2$ for the remainder of the reaction.

The emulsion was gradually heated to and maintained at 75° C. until a self-sustaining exotherm was observed. The peak exotherm was observed to be about 83° C., and the duration of the exotherm lasted 25 to 35 min. Once the reaction exotherm subsided, the reactor was cooled to 80° C. and mixing was maintained for 10 additional min.

A solution of DAAM (0.3 g) and methyl methacrylate (MMA, 36.3 g) was then added to the reactor over 45 min, after which time the reaction temperature was maintained at 80° C. for 15 min. The contents were cooled to 65° C., at which time ferrous sulfate (5 mL of a 0.15% solution in water) was added to the reactor. Residual monomers were chased with t-butyl hydroperoxide (t-BHP, 0.1 g of a 70% solution diluted with 5 mL of water) and isoascorbic acid (IAA, 0.15 g diluted with 5 mL of water) were fed separately over 30 min, after which time the reactor was cooled to room temperature. The resultant latex emulsion was filtered through a 100-mesh screen. Solids content was 35.7%.

Comparative Intermediate Example 1

Synthesis of Microsphere Beads not Functionalized with DAAM

Comparative Intermediate Example 1 was prepared substantially as described for Intermediate Example 1 except that, for ME1, no DAAM was used and an additional 1.5 g of 2-EHA was used; and for ME2, no DAAM was used and an additional 0.3 g of MMA was used.

Intermediate Example 2

Synthesis of a DAAM Functionalized Binder

A monomer emulsion was prepared by mixing deionized water (764.6 g) with Rhodafac RS-610/A25 surfactant (18.8 g). Monomers were mixed into the emulsion in the following order: DAAM (36.6 g), butyl acrylate (BA, 356.7 g), benzophenone (28.0 g), ethyl hexyl acrylate (EHA, 503.2 g), MMA (880.7 g), and methacrylic acid (MAA, 46.6 g).

To a 5-L, four necked round bottom flask equipped with a paddle stirrer, a thermometer, $N_2$ inlet, and a reflux condenser was added deionized water (1029.0 g) and Rhodafac RS-610/A25 surfactant (98.2 g), sodium carbonate (7.56 g dissolved in 47 g of water) followed by a water rinse (28 g). The contents of the flask were heated to 85° C. under $N_2$ and stirring was initiated.

A portion of the first monomer emulsion (ME1, 117.2 g) was added to the reactor, followed by an aqueous solution of ammonium persulfate (5.67 g dissolved in 25 g deionized water). After the onset of the exotherm, the reactor temperature was maintained at 85° C. for the remainder of the ME1 feeds. When the reactor temperature reached 85° C., ME1 was fed to the flask over 79 min. Ureido Methacrylate (46.6 g) was added to ME1 40 min after the start of the ME1 feeds. Once the ME1 feed was complete, a water rinse (20-mL) was added to the reactor and the reaction was maintained at 85° C. for 5 min.

A promoter solution of ferrous sulfate heptahydrate (6.32 g of a 0.15% aqueous solution) was added to the reactor followed by addition VERSENE™ EDTA Chelating Agent (1.0 g of 1% aqueous solution, A Trademark of The Dow Chemical Company or its Affiliates).

The residual monomers were chased using t-BHP (1.9 g of a 70% aqueous solution) and deionized water (21.0 mL) and IAA (0.9 g 30.0 mL of water), which were fed separately to the reactor over 30 min.

The reactor was cooled to room temperature, during which time aqueous ammonium hydroxide (15.2 g of a 28% aqueous solution) was added to the reactor. A slurry of adipic acid dihydrazide (18.8 g) in water (32 g) was then added to the reactor. Once the reactor temperature cooled to below 30° C., KATHON™ LX 1.4 Biocide 1.4 (14.4 g in 15 mL of water, A Trademark of The Dow Chemical Company or its Affiliates) was added to the reactor. Once the reactor was cooled to room temperature the resulting dispersion was filtered through a 325-mesh screen. Solids content was 47%.

Comparative Intermediate Example 2

Synthesis of Binder not Functionalized with DAAM

Comparative Intermediate Example 2 was prepared substantially as described for the preparation of Intermediate Example 2 except that DAAM (36.6 g) was replaced with an additional amount of MMA (36.6 g).

Paint Preparation

In a 0.25 liter plastic container, binder, TAMOL™ 731A Dispersant (0.7 g), TRITON™ CF-10 Surfactant (0.2 g), and BYK-022 defoamer (0.3 g) were mixed together with overhead stirring for 1 min. $TiO_2$ slurry Ti Pure R-746 (24 g) and polymer beads were added slowly to the above solution. Stirring speed was adjusted to ensure adequate mixing. The mixing was continued for 5 min. Next, Texanol coalescent (0.7 g)) and propylene glycol (0.6 g) were added slowly to the mixture and continued mixing for additional 2 to 3 min. Stirring speed was increased and ACRYSOL™ RM-2020 Rheology Modifier (2 g) was added slowly. Next, ACRYSOL RM-8W Rheology Modifier (1.4 g) and the remaining letdown water (see Table 1) were added under high speed stirring to adjust the viscosity. Mixing was continued for an additional 5 to 10 min. The final mixture was a pigmented, microsphere containing paint. (TAMOL, TRITON, and ACRYSOL are all Trademarks of The Dow Chemical Company or its Affiliates.)

Table 1 illustrates the bead and binder amounts in the paint formulations. C1, C2, and C3 refer to comparative paint formulations 1, 2, and 3, and Ex 1 refers to Example 1. DAAM Beads refers to the amount of DAAM functionalized microsphere beads (from Intermediate Example 1) in the paint; Non-DAAM beads refers to the amount of microsphere beads not functionalized with DAAM (from Comparative Intermediate Example 1) in the paint; DAAM Binder refers to the amount of DAAM functionalized binder (from Intermediate Example 2) in the paint; and Non-DAAM functionalized binder refers to the amount of binder not functionalized with DAAM (from Comparative Intermediate Example 2). All amounts are in grams.

TABLE 1

Bead and Binder Amounts in the Paint Formulation

| Paint Ex | DAAM-Beads | Non-DAAM Beads | DAAM-Binder | Non-DAAM Binder |
| --- | --- | --- | --- | --- |
| C1 | 0 | 26.5 | 0 | 38.5 |
| C2 | 0 | 26.5 | 37.1 | 0 |
| C3 | 25.7 | 0 | 0 | 38.5 |
| Ex 1 | 25.7 | 0 | 37.1 | 0 |

Scrub Resistance Testing Method:

Paints were draw down over Black Leneta Vinyl charts using a 7-mil application bar in duplicate and dried at 77° F. (25° C.), 50% relative humidity for 7 d. After drying, each chart was cut in half lengthwise to produce four test strips for each coating. Scrub medium was prepared by thoroughly mixing Leneta Standardized Abrasive Type Scrub Medium SC-2 (636 g), water (318 g), and Airex 901W defoamer (1.5 g). The scrub tests were performed on a machine equipped with Masterflex L/S tubing pump, a metal tray with a 0.5" by 10-mil brass shim, and nylon bristle brush. Each strip was placed on the metal tray over the shim with coated side up and secured with clamps. Scrub medium (10 g) was dispensed on the coating and the test was started with the counter set at zero. After each 400 cycles (before failure) an additional amount scrub medium (10 g) was dispensed before the test was continued. Scrub resistance was reported as the number of cycles needed to remove the coating fully in one continuous line across the 0.5" width of the shim. The mean values of the scrub cycles for the coatings were reported based on eight measurements per coating and the results are illustrated in Table 2.

TABLE 2

Mean Scrub Values of Coatings

| Paint Ex | Scrub (Mean) |
| --- | --- |
| C1 | 357 |
| C2 | 444 |
| C3 | 253 |
| Ex 1 | 734 |

The results show clearly superior scrub resistance for the coating formed using binder and beads that are each functionalized with DAAM.

The invention claimed is:
1. A composition comprising
   a) an aqueous dispersion of
      1) polymer particles having an average particle size in the range of from 75 nm to 350 nm, and

2) crosslinked polymer beads having an average particle size in the range of from 1 μm to 30 μm;
wherein the polymer particles comprise from 0.1 to 12 weight percent structural units of a monomer containing keto functionality, based on the weight of the polymer particles; and the crosslinked polymer beads comprise 0.05 to 12 weight percent structural units of a monomer containing keto functionality based on the weight of the crosslinked polymer beads; and
wherein the weight to weight ratio of polymer particles to crosslinked polymer beads is in the range of 1:10 to 10:1; and
b) from 0.1 to 10 weight percent of a dihydrazide or a polyamine crosslinking agent, based on the weight of the paint composition.

2. The composition of claim 1 wherein the polymer particles comprise from 0.5 to 10 weight percent structural units of a monomer containing keto functionality, based on the weight of the polymer particles; and the crosslinked polymer beads comprise 0.2 to 10 weight percent structural units of a monomer containing keto functionality, based on the weight of the polymer beads; wherein the polymer particles have an average particle size in the range of from 80 nm to 250 nm; and the crosslinked polymer beads have an average particle size in the range of from 5 μm to 20 μm.

3. The composition of claim 2 wherein the weight to weight ratio of polymer particles to crosslinked polymer beads is in the range of 4:6 to 8:2, wherein the crosslinked polymer beads have an average particle size in the range of from 5 μm to 15 μm.

4. The composition of claim 1 wherein the monomer containing keto functionality is diacetone acrylamide at a concentration in the range of 1 to 5 weight percent, based on the weight of the polymer particles, or acetoacetoxyethyl methacrylate at a concentration in the range of 2 to 10 weight percent, based on the weight of the polymer particles; and the crosslinking agent is a dihydrazide crosslinking agent.

5. The composition of claim 1 wherein the composition further comprises a substantial absence of inorganic extenders having a refractive index in the range of 1.0 to 1.9, wherein the dihydrazide crosslinking agent is adipic acid dihydrazide.

6. The composition of claim 5 wherein the composition comprises less than 5 PVC of the inorganic extender having a refractive index in the range of 1.0 to 1.9.

7. The composition of claim 1, wherein the composition comprises less than 1 PVC of the inorganic extender having a refractive index in the range of 1.0 to 1.9; wherein the composition further includes at least one material selected from the group consisting of a rheology modifier, a defoamer, a neutralizing agent, a surfactant, a dispersant, an opaque polymer, and $TiO_2$.

8. The composition of claim 7 which comprises $TiO_2$.

* * * * *